Nov. 22, 1927. 1,649,798

G. W. BEADLE

TYPOGRAPHICAL DISTRIBUTING MACHINE

Filed Aug. 13, 1926 4 Sheets-Sheet 2

INVENTOR
George W. Beadle
BY
Rogers, Kennedy & Campbell
ATTORNEYS

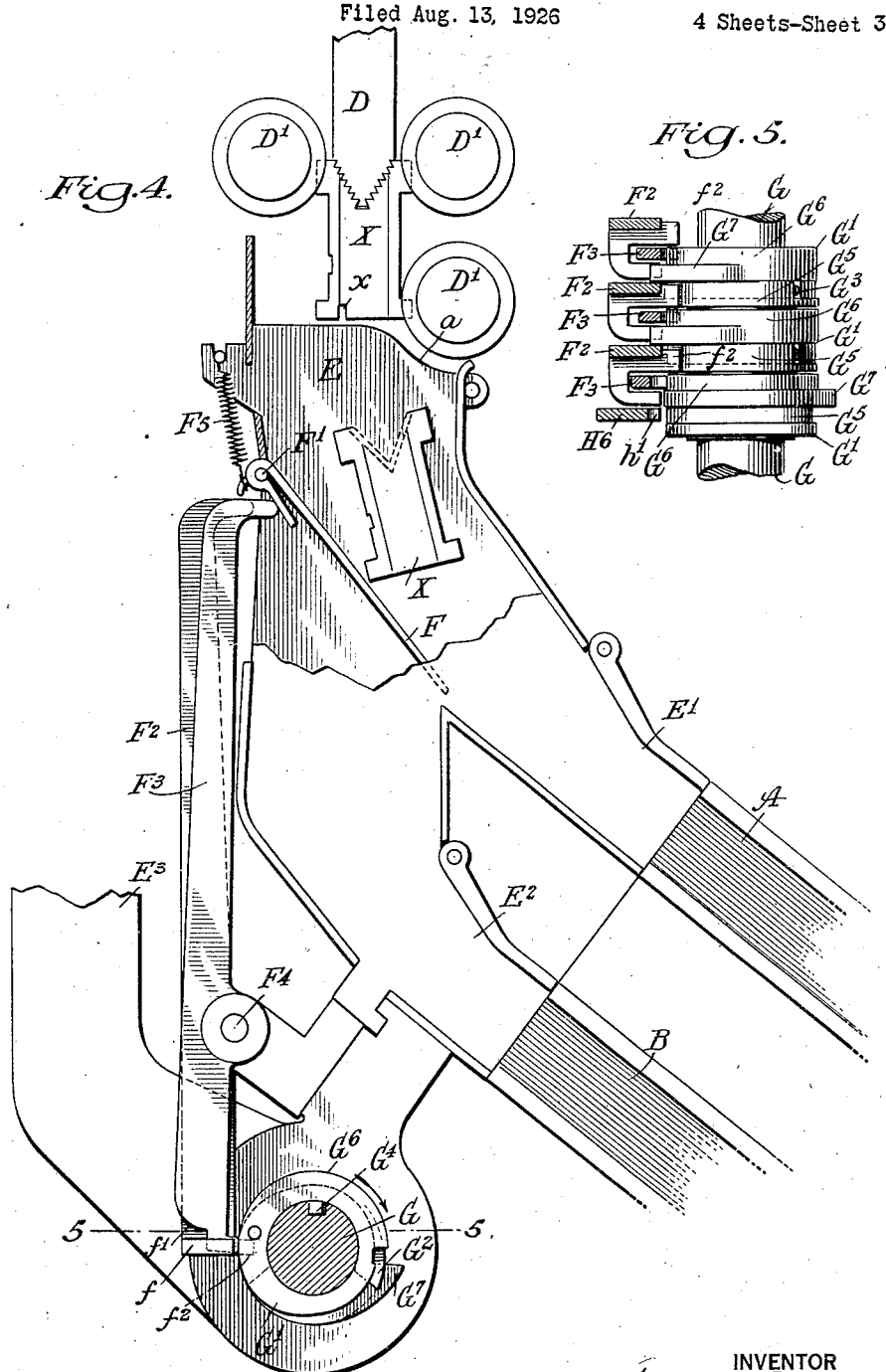

Nov. 22, 1927.
G. W. BEADLE
1,649,798
TYPOGRAPHICAL DISTRIBUTING MACHINE
Filed Aug. 13, 1926  4 Sheets-Sheet 4
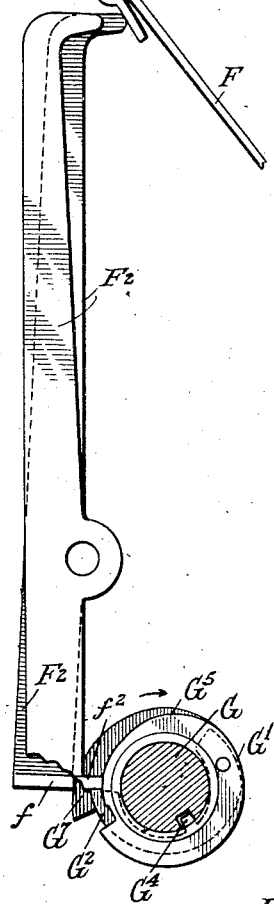
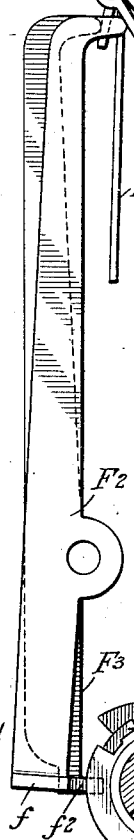
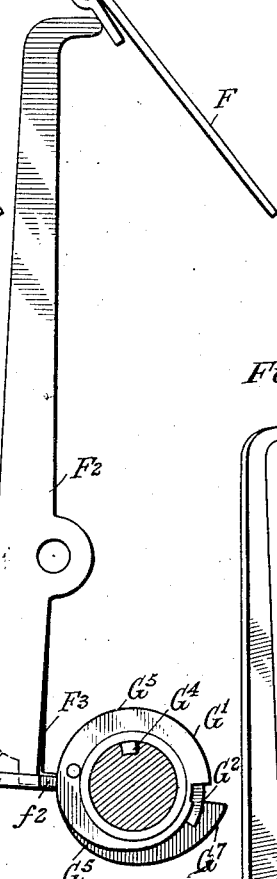
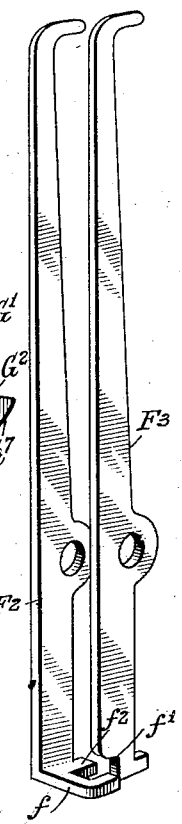
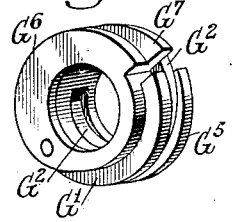
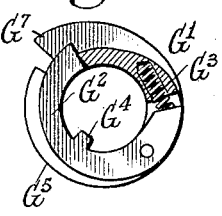
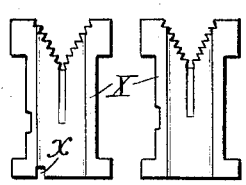
INVENTOR
George W. Beadle
BY
Rogers, Kennedy Campbell
ATTORNEYS Patented Nov. 22, 1927.

1,649,798

UNITED STATES PATENT OFFICE.

GEORGE W. BEADLE, OF NEW YORK, N. Y., ASSIGNOR TO MERGENTHALER LINOTYPE COMPANY, A CORPORATION OF NEW YORK.

TYPOGRAPHICAL DISTRIBUTING MACHINE.

Application filed August 13, 1926. Serial No. 128,919.

This invention relates to typographical distributing machines, such as linotype machines of the general organization represented in Letters Patent of the United States, No. 436,532, to O. Mergenthaler wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through distributing mechanism to the magazine from which they started.

More particularly, it relates to that type of machines equipped with a plurality of matrix fonts and with distributing mechanism which first separates the matrices according to character and thereafter sorts them according to form or font for delivery to their respective magazines. In order to maintain the desired speed of distribution, it is important that the font sorting of the matrices should be carried out in a continuous manner and without interrupting the matrices in their passage to the magazines. It is also desirable that the standard form of the matrices be adhered to, if possible, so that the vast number of outstanding fonts may be utilized in the machine when desired.

The present invention is intended to meet these and other requirements and contemplates an arrangement whereby matrices of variant fonts are first released according to character from a single distributor bar and then dropped directly into a channel entrance having suitable throats or conductors which discharge them immediately according to font into their respective magazines. To this end, the channel entrance is provided with a series of individual switches which control the passage of the matrices into one or another of the respective conductors and which are operated in a predetermined order of succession under the influence of mechanism controlled by the matrices themselves. As preferred, the switch actuating mechanism is operated in synchronism with the distributor screws and in such manner that any matrix of a given font will cause every switch to be operated successively throughout the series, the operation of the individual switches being timed to take place slightly ahead of the advancing matrix so that when the latter reaches its releasing point on the distributor bar, the corresponding switch will have been moved into position to control its delivery to the proper conductor. Furthermore, the control of the individual switches is such that each will be maintained in its deflecting position long enough to direct the released matrix into its proper magazine and then be moved to its non-deflecting position in time to permit a succeeding matrix belonging to a different font to pass into its appropriate magazine without interruption.

In the accompanying drawings, the invention has been shown only in preferred form and by way of example, and as applied to a linotype machine of the class stated, but obviously many changes and variations may be made therein, and in its mode of application, which will still be comprised within its spirit. Thus, it may be similarly applied to other forms of typographical machines, such as typesetters and the like, which handle type or dies instead of matrices. Generally speaking, it is to be understood that the invention is not limited to any specific form or embodiment, except in so far as such limitations are specified in the claims.

Referring to the drawings:

Fig. 4 is a view similar to Fig. 1 with certain parts eliminated and showing the switch operating mechanism in another position;

Fig. 5 is a detail horizontal section taken on line 5—5 of Fig. 4;

Figs. 6, 7 and 8 are detail views showing the switch operating mechanism in different positions;

Fig. 9 is a perspective view of the two types of switch operating levers employed;

Fig. 10 is a perspective view of one of the cam units;

Fig. 11 is a vertical section taken through one of the cam units; and

Fig. 12 illustrates, in face view, two matrices of different form and belonging to different fonts.

The matrices X are stored according to font in the channeled magazines A, B, from which they are released in the required order and assembled in line in the customary way. After the slug has been cast, the line is carried upward and transferred endwise through the distributor box C into the path of the lifting finger $C^1$ which detaches the matrices one after another from the line and delivers them to the overlying distributor, all as well understood in the art. The distributor is also of standard construction, comprising the longitudinally ribbed bar D and the set of matrix conveying screws $D^1$, whereby the matrices are released according to character and irrespective of font at different points along the distributor bar.

Figure 1:
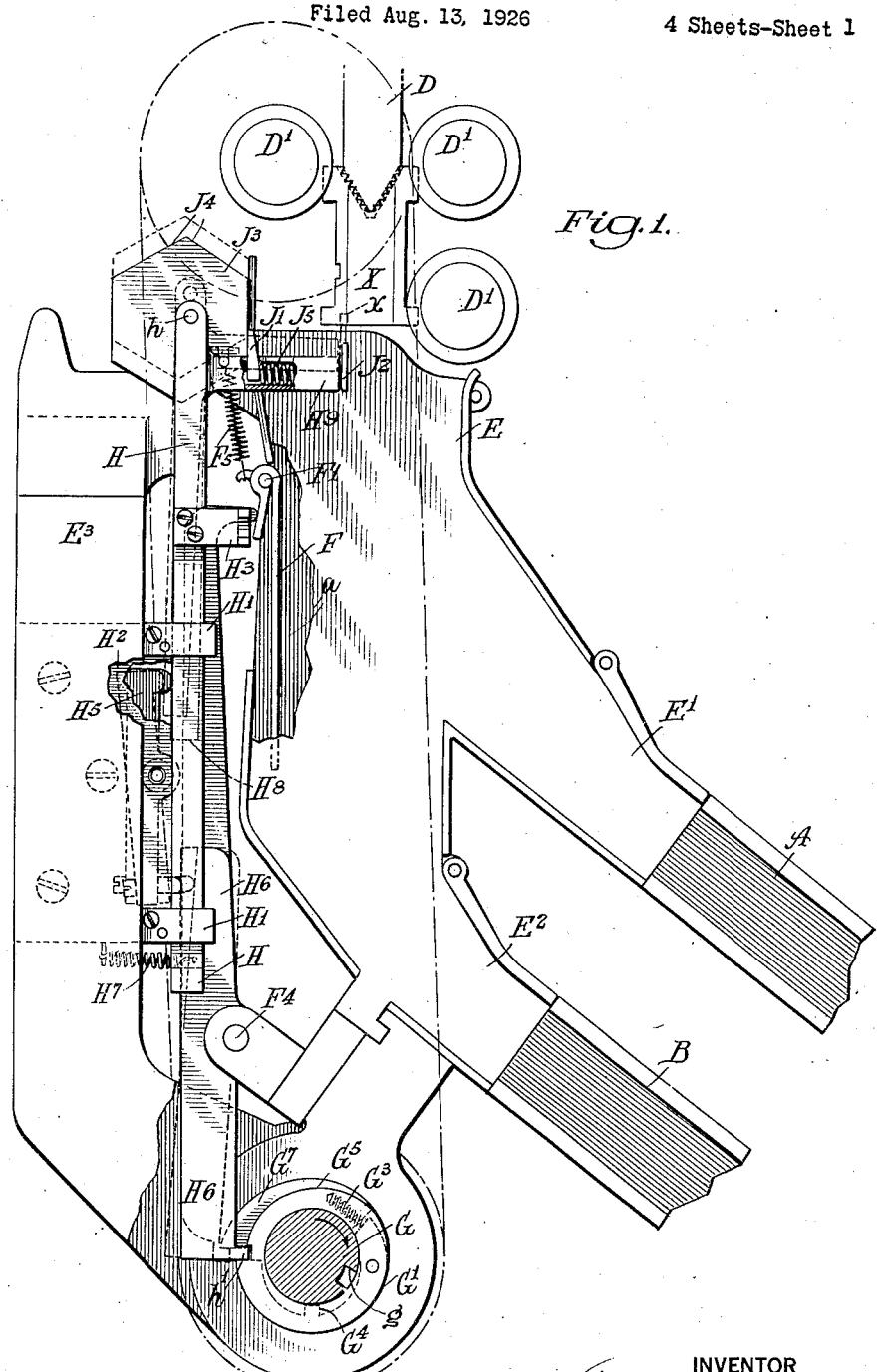
Fig. 1 is a side elevation, partly in section, of the upper portion of a linotype machine having the invention incorporated therein.

According to the present invention, as the matrices are released from the distributor bar D, they drop into a channel-entrance E formed with two throat sections or conductors $E^1$, $E^2$, leading to the respective magazines A, B, and divided by partitions $a$ into a series of channels arranged in registry with the corresponding channels of the magazines. In order that matrices belonging to the upper magazine A may be directed into the conductor $E^1$ and those belonging to the lower magazine B into the conductor $E^2$, the entrance is provided with a series of switches F pivotally mounted at their upper ends on a transverse rod $F^1$ and movable into or out of the path of the falling matrices according to their destination (see Figs. 1 and 4 by way of contrast). The switches F are operated by a series of vertically disposed rocking levers $F^2$, $F^3$, pivotally mounted at $F^4$ adjacent the back plate of the entrance E. The upper ends of these levers are arranged to engage the respective switches F slightly below the pivot rod $F^1$, while the lower ends thereof are arranged to cooperate with a series of rotatable cam units $G^1$ mounted upon a constantly driven shaft G. For reasons presently to be pointed out, the lower ends of the levers $F^2$, $F^3$ are differently formed, as best shown in Fig. 9, the levers $F^2$ being provided each with a recessed offset portion $f$, and the levers $F^3$ undercut as in $f^1$. Normally, the cam units $G^1$ have no connection with the shaft G and are therefore idle, and under such conditions the switches F, as permitted by the rocking levers $F^2$, $F^3$, are maintained by pull springs $F^5$ in their downwardly swung position to permit the matrices belonging to the lower magazine B to pass into the conductor $E^2$ (see Fig. 1). The springs $F^5$ also serve to keep the switches in constant engagement with the upper ends of the rocking levers and the latter engaged with the cam units. When matrices belonging to the upper magazine are being distributed, however, the cam units are momentarily connected to the shaft G and are adapted by their rotation to actuate the levers $F^2$, $F^3$ which swing the switches into their raised position to direct the matrices into the conductor $E^1$ (see Fig. 4).

In providing for the successive operation of the switches F, each cam unit $G^1$ (see Figs. 10 and 11) is furnished with a clutch member or connector $G^2$ whereby the units may be individually connected to the shaft G. These clutch members (Fig. 11) are each in the form of a pivoted pawl actuated at one end by a spring $G^3$ and provided midway between its ends with a tooth $G^4$ adapted, under the influence of the spring, to engage within a longitudinal groove $g$ formed along the shaft G. Normally (see Fig. 1), the clutch teeth $G^4$ are held disengaged from the shaft groove $g$ by lugs $f^2$ projecting inwardly from the lower ends of the levers $F^2$ and engaging the free ends of the pawls $G^2$, but obviously when the lugs $f^2$ are disengaged from the pawls $G^2$ the latter will be instantly rocked inwardly by the springs $G^3$ and the teeth $G^4$ caused to enter the shaft groove $g$ in establishing the required connection between the shaft G and the cam units $G^1$. It will be noted that the cam units $G^1$ are each formed with two diametrically opposed cam surfaces $G^5$, $G^6$, and with a trip lug $G^7$—the two cam surfaces serving to actuate a pair of adjacent levers $F^2$, $F^3$ respectively, and the trip lug serving to release the clutch member $G^2$ of the next unit through the medium of the offset portion $f$ of the lever $F^2$ associated with said next unit.

Figure 2:
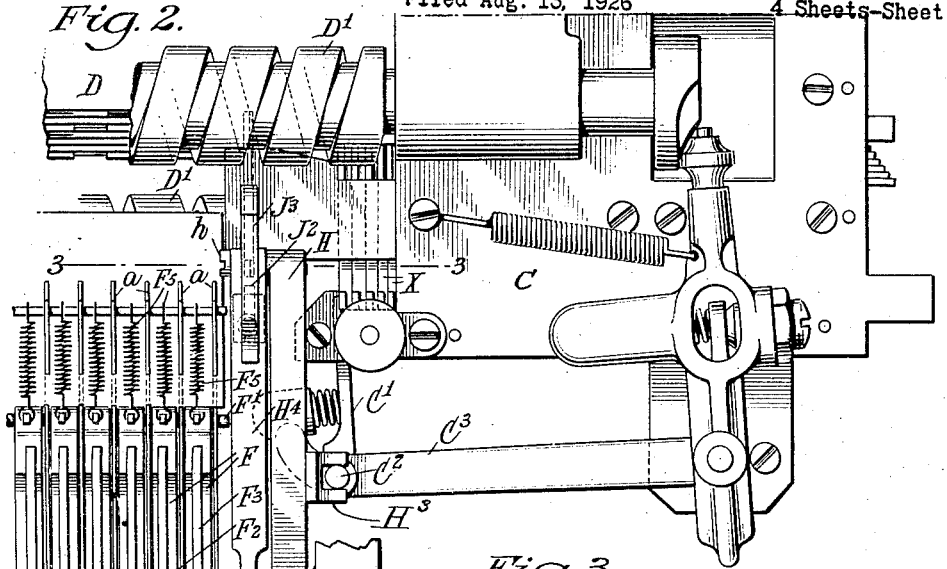
Fig. 2 is a rear elevation thereof.

As a result of the foregoing arrangement, and assuming that the clutch pawl $G^2$ of one unit of the series has been tripped,—let us say, for example, the second cam unit from the right in Fig. 2,—it is pointed out (see also Fig. 6) that, as the pawl comes into contact with the lug $f^2$ of the first lever $F^2$ and the second cam unit is thus immediately disconnected from the shaft G, the trip lug $G^7$ will have engaged the offset portion $f$ of the second lever $F^2$ to the left and released the clutch member $G^2$ of the third cam unit. The latter will have had time to start rotating before the said trip lug $G^7$ passes out of engagement with the offset portion $f$, so that the lug $f^2$ of the second lever $F^2$ will engage the high portion of the cam surface $G^5$ of the third unit as the second unit comes to rest. The switch controlled by this second lever $F^2$ will thus be located (see Fig. 7) in its raised position and be maintained there temporarily for a half-rotation of the cam unit; it being noted that said high portion of the cam $G^5$ is concentric for approximately 180°. At this point in the rotation of the third cam unit, the associated lever $F^3$ (the third from the left in Fig. 2) will have been pressed back and reach the high portion of the cam surface $G^6$ (see Fig. 8) and the corresponding switch, controlled thereby, located in its raised position. As the unit continues to rotate, the lug $f^2$ of the second lever $F^2$ moves gradually down to the low portion of the cam surface $G^5$, as permitted by the undercut $f^1$ of the adjacent lever $F^3$, and at or about the time the unit completes its rotation, the clutch pawl $G^2$ engages the lug $f^2$ and is forced thereby out of engagement with the shaft G. At this time, as in the preceding case, the trip lug of this third unit engages the offset portion $f$ of the third lever $F^2$ to the left (not shown) and releases the clutch member $G^2$ of the fourth cam unit, the same operation continuing successively throughout the series. During the latter half-rotation of the respective cam units, the levers $F^3$ will have been maintained upon the high portions of the cam surfaces $G^6$, which have approximately the same concentricity as the cam surfaces $G^5$, so that the switches controlled thereby will also be allowed sufficient dwell in their raised position to insure the delivery of their gravitating matrices into the conductor $E^1$ before they are allowed to return to their normal position.

It will be understood that the operation of the switches should be timed according to the speed of travel of the matrices along the distributor bar in order that the switches may be located in either of their different positions to control the delivery of the released matrices according to form into one or the other of the conductors $E^1$, $E^2$. Consequently, as indicated by the broken lines in Fig. 1, the shaft G is driven from one of the distributor screws and preferably at the same speed of rotation, so that the cam units and parts controlled thereby will be operated in synchronism with the distributor proper. In this connection, it is noted (Fig. 2) that the threads of the distributor screws $D^1$ are given a half-inch pitch and that the releasing points of the distributor bar D, as well as the partitions $a$ of the entrance E, are spaced a quarter-inch apart. In other words, there are twice as many bar releasing points and entrance channels as there are threads on the distributor screws. Consequently, while the switches are operated successively at every half-rotation of the shaft G, the matrices are advanced a half-inch or a distance equal to the space occupied by two adjacent switches at each complete rotation of the shaft, although, as before explained, the timing of the parts is such that the operation of the switches takes place in advance of the release of the matrices from the distributor bar. Of course, the present arrangement could be modified so as to have the switches actuated successively at every complete rotation of the shaft G, instead of at every half-rotation thereof, but in that event the shaft G would have to be driven at twice the speed of the distributor screws. There are other ways of obtaining the desired results, but in any case, the switches must be operated according to the speed at which the matrices traverse the distributor bar and, since it is desirable to maintain a maximum speed of distribution, the relation of the parts as above described is preferred.

The operation of the switches is governed by matrix controlled mechanism which sets the cam units $G^1$ into motion or leaves them undisturbed, according to the form of the matrices to be distributed. In the preferred embodiment illustrated, there is provided a vertical reciprocating slide H mounted in suitable guideways $H^1$ of a fixed bracket plate $H^2$ and arranged adjacent the matrix lifting finger $C^1$ to which it is operatively connected by a pin $C^2$. The pin $C^2$ serves as the pivot for the finger $C^1$, and protrudes from the side of the rocking arm $C^3$ so as to engage a small slotted plate $H^3$ secured to the side of the slide H. As shown in Fig. 2, the slide H cooperates with the cam units $G^1$ through the medium of three levers $H^4$, $H^5$, $H^6$. The lower lever $H^6$ serves in the same capacity as the rocking levers $F^2$, in so far as the control of the clutch pawls $G^2$ is concerned, being pivoted upon the rod $F^4$ before referred to, and having its lower end provided with a lug $h^1$ corresponding to the lugs $f^2$ of the levers $F^2$. This lug $h^1$ is arranged so as to be engaged with or disengaged from the clutch pawl $G^2$ of the first cam unit $G^1$ of the series, that unit having only one switch operating lever $F^3$ which it actuates by the cam surface $G^6$. A spring $H^7$ anchored to the bracket plate $H^2$ acts to hold the lever $H^6$ normally engaged with the clutch pawl $G^2$. The upper lever $H^4$ is of the bell crank type and is pivotally connected by a pin $h$ to the upper end of the slide H. The longer vertical arm $H^8$ of this lever extends downwardly parallel to the slide H and makes connection with one end of the intermediate lever $H^5$, the latter being pivoted about midway of its length to the bracket plate $H^2$ and provided at its opposite end with a set screw arranged to engage the upper end of the lever $H^6$. It will be noted (see Fig. 1) that the depending arm $H^8$ of the lever $H^4$ extends sufficiently below the upper end of the lever $H^5$ to maintain a constant engagement therewith during the reciprocation of the slide H. With this arrangement, the rearward rocking of the lever arm $H^8$ shifts the lower lever $H^6$, through the intermediate lever $H^5$, to the dotted line position indicated in Fig. 1 and releases the clutch pawl $G^2$ of the first cam unit $G^1$, which is immediately coupled to the shaft G and causes the first switch of the series to be swung upwardly to its raised position by the operation of the lever $F^3$ (the first at the right in Fig. 2). As the first unit completes its rotation, the trip lug $G^7$ thereon will be caused to engage the offset portion $f$ of the first lever $F^2$ associated with the next or second cam unit and thereby bring about the coupling of that unit to the shaft $G$, and each unit in turn will likewise be temporarily connected to the shaft $G$ so as to function in the manner before described.

Figure 3:
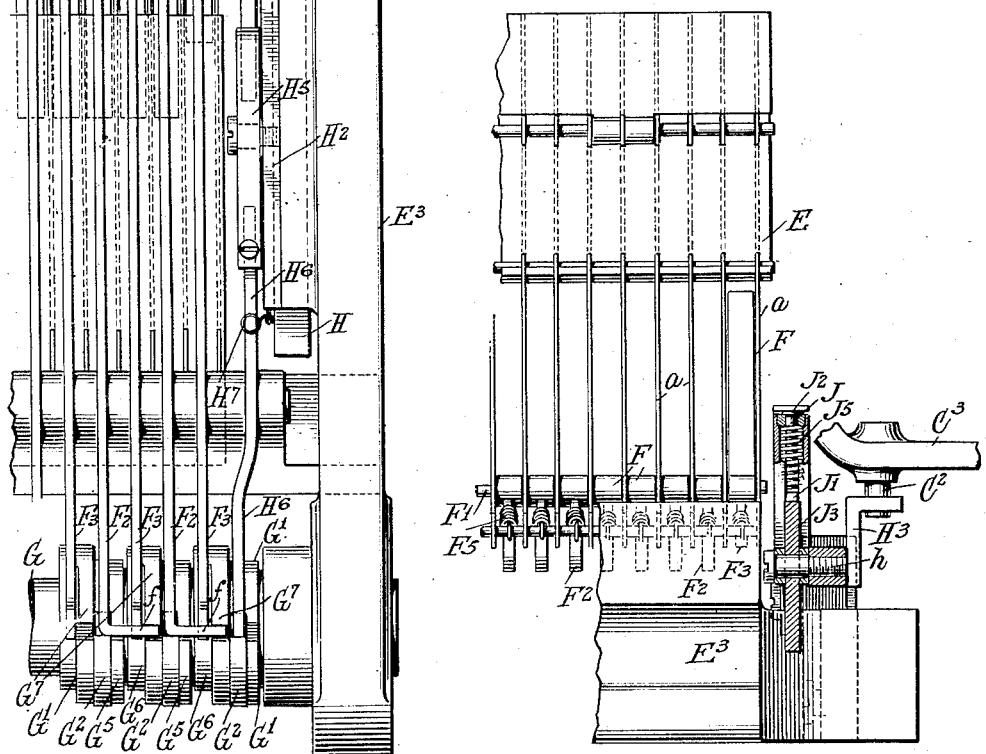
Fig. 3 is a horizontal section taken on line 3—3 of Fig. 2.

The operation of the bell crank lever $H^4$ and parts connected therewith is controlled by a matrix detecting device arranged to cooperate with each matrix after it is detached from the line by the lifting finger $C^1$. In the present instance, (and as best shown in Fig. 3) there is provided a slide member $J$ mounted in the short horizontal arm $H^9$ of the lever $H^4$ and provided at its inner end with an upstanding finger $J^1$. At its outer end, the slide member $J$ is provided with a detector plate $J^2$ located at a predetermined distance below the bottom edge of a matrix when supported on the distributor bar $D$ and adapted by the upward movement of the slide $H$ to engage said matrix. If the matrix happens to be of a form belonging to the upper magazine $A$ (e. g. the unnotched matrix in Fig. 12), the plate $J^2$ will come in contact with its bottom edge as the slide $H$ is moved upwardly and rock the bell crank lever $H^4$ to the dotted line position shown in Fig. 1, so as thus to initiate the operation of the first cam unit $G^1$ in the manner last described. On the other hand, if the matrix happens to be of a form belonging to the lower magazine, such as that indicated at the left in Fig. 12, the plate $J^2$ will enter the ordinary font notch $x$ (which, for the sake of illustration, serves to distinguish the fonts of the respective magazines $A$, $B$) and fail to operate the lever $H^4$, which therefore will leave the cam units at rest or unaffected.

In order that the detector may be capable of cooperating with various fonts of matrices whose notches $x$ are differently located, the plate $J^2$ is made adjustable by means of a gauge plate $J^3$ which is pivotally mounted on the pin $h$ before mentioned and formed with a number of sides or gauge surfaces $J^4$. The finger $J^1$ of the slide member $J$ is normally pressed against the gauge plate $J^3$ by a spring $J^5$ arranged behind it in the arm $H^9$ so that the detector plate $J^2$ may, by manual rotation of the gauge plate, be set in different positions according to the fonts of matrices in use and as determined by the gauge surface selected. It will be further noted, by reference to Fig. 2, that the detector plate $J^2$, indicated in dotted lines, is located about a quarter-inch to the right of the first partition $a$, so that the operation of the first switch of the series will take place in time to intercept the falling matrix if it should be released at the first combination of the distributor bar and destined for the upper magazine.

By way of recapitulation, assume that a matrix, after detachment from the line by the lifting finger $C^1$, has been advanced along the bar $D$ by the screws $D^1$ until it has reached a position above the detector plate $J^2$ as the lifting finger $C^1$ starts its upstroke,—as a matter of fact, the parts will be so related that under normal conditions this will always be the case. If the matrix arriving in such position happens to be of the form indicated at the right in Fig. 12 and to belong in the first channel of the upper magazine $A$, the bell crank lever $H^4$ will be rocked so as to trip the clutch member $G^2$ of the first cam unit $G^1$ through the connections before described, and since the first lever $F^3$ will not be actuated until said cam unit has been made a half-rotation, the matrix will have had time, on account of the pitch given the screw threads, to cover the distance from the detector plate $J^2$ to the bar combination overlying the first channel of the entrance $E$ before or as the first switch is swung to its raised position. The concentric portion of the cam surface $G^6$ then serves to maintain the switch in this position long enough (although, necessarily, only momentarily) to permit the matrix to be directed into the conductor $E^1$. If the next or succeeding matrix happens to be of the same form and to belong in the second magazine channel, the same operation will be repeated, although in this case the second switch will have been lifted before the matrix reaches its releasing point on the bar, by reason of the operation of the second cam unit initiated by the trip lug of the first cam unit. The same conditions will prevail in the case of any matrix destined for the upper magazine regardless of its releasing point on the distributor bar, the successive operation of the cam units in timed relation to the advance of the matrices along the bar insuring the proper distribution of the matrices under any and all conditions. It is only when matrices belonging to the lower magazine are presented to the detecting device that the cam units are not set into operation, although it will be understood that at the time of presentation of such matrices the cycle of operation of the cam units throughout the series may not have been completed. The point is that the operation of the cam units is initiated and carried throughout all the units of the series whenever any matrix belonging to the upper magazine is presented for distribution, and this in order to insure the proper deflection of the individual matrices when they drop from the distributor bar at whatever points their distribution according to character requires. In this way, the sorting of the matrices according to font is controlled in advance of the actual distribution and by mechanism subject to the influence of each matrix of a given font. The matrices pass through the machine in a continuous stream and without interruption, permitting the distribution to take place at the ordinary speed or at any desired speed. In addition, the matrices are or may be of standard form and such as are used in the commercial linotype machines now in use, requiring no special cuts or other distinguishing notches to enable them to be handled by the improved distributing mechanism. These and many other advantages will be readily appreciated by those skilled in the art.

While the present improvements have been illustrated as applied to a machine equipped with only two magazines, it is obvious that they are applicable to a greater number of magazines. Similarly, the form and arrangement of the switches as herein shown is not essential to carry out the invention, as it is obvious that they could be radically modified without departing from the spirit of the invention. The same is true of the operating mechanism for the switches. As before stated, the invention in not intended to be limited to any particular form or arrangement of the parts, except in so far as such limitations are specified in the claims.

Having thus described my invention, its construction and mode of operation, what I claim and desire to secure by Letters Patent of the United States is as follows:

1. In a typographical distributing machine equipped with type or matrices of variant form, the combination of a distributor for releasing matrices of different forms at a common point, means for feeding the matrices continuously to the distributor without regard to form, a switch for controlling the delivery of the released matrices to one point or the other according to form, and power-actuated means distinct from but controlled by the matrices prior to their release for operating the switch.

2. In a typographical distributing machine equipped with type or matrices of variant form, the combination of a distributor for releasing matrices of different forms at a common point, means for feeding the matrices continuously to the distributor without regard to form, a switch for controlling the delivery of the released matrices to one point or the other according to form, power-actuated means for operating the switch, and a detecting device arranged to cooperate with the matrices prior to their release for controlling said power-actuated means.

3. In a typographical distributing machine equipped with type or matrices of variant form, the combination of a distributor for releasing matrices of different forms at a common point, means for feeding the matrices continuously to the distributor without regard to form, a switch for controlling the delivery of the released matrices to one point or the other according to form, a cam unit for operating the switch, a constantly rotating shaft whereon the cam unit is loosely mounted, and means controlled by the matrices prior to their release whereby the cam unit may be connected to the shaft when required.

4. In a typographical distributing machine equipped with type or matrices of variant form, the combination of a distributor for releasing matrices of different forms at a common point, means for feeding the matrices continuously to the distributor without regard to form, a switch for controlling the delivery of the released matrices to one point or the other according to form, a cam unit for operating the switch, a constantly rotating shaft, a clutch whereby said cam unit may be connected to the shaft, and a detecting device arranged to cooperate with the matrices prior to their release for controlling the clutch.

5. In a typographical distributing machine equipped with type or matrices of variant form, the combination of a distributor for releasing matrices of different forms, at a common point, means for feeding the matrices continuously to the distributor without regard to form, a switch for controlling the delivery of the released matrices to one point or the other according to form, a cam unit for operating the switch, a constantly rotating shaft, a clutch whereby said cam unit may be connected to the shaft, a matrix detecting device operatively connected to the clutch, and means for adjusting the detecting device for cooperation with matrices of different form.

6. In a typographical distributing machine equipped with type or matrices of variant form, the combination of a single distributor comprising a distributor bar and a set of matrix conveying screws whereby matrices are released according to character at different points along the bar, two channeled magazines into which the released matrices pass by gravity, a series of switches for controlling the delivery of the gravitating matrices into one magazine or the other according to form, and means controlled by the individual matrices of a given form for operating the switches in a predetermined order of succession throughout the series.

7. In a typographical distributing machine equipped with type or matrices of variant form, the combination of a single distributor comprising a distributor bar and a set of matrix conveying screws whereby matrices are released according to character at different points along the bar, two channeled magazines into which the released matrices pass by gravity, a series of switches for controlling the delivery of the gravitating matrices into one magazine or the other according to form, means for feeding the matrices continuously one by one to the distributor, and means controlled by the individual matrices as they are fed to the distributor for governing the operation of the switches.

8. In a typographical distributing machine equipped with type or matrices of variant form, the combination of channeled magazine wherein the matrices are stored according to form, a single distributor whereby the matrices are released according to character above the respective magazine channels, a series of switches adjustable relatively to the magazines for controlling the delivery of the released matrices thereto, and means distinct from but controlled by the matrices for adjusting the switches successively throughout the series to their different positions, said means being operated according to the speed at which the matrices are advanced along the distributor so that a switch will be adjusted to one position to control the delivery of a matrix bearing a certain character and of a given form into its appropriate magazine and then adjusted to another position in time to control the delivery of a succeeding matrix bearing the same character but of different form into its appropriate magazine.

9. In a typographical distributing machine equipped with type or matrices of variant form, the combination of channeled magazines wherein the matrices are stored according to form, a single distributor whereby the matrices are released according to character above the respective magazine channels, a series of switches adjustable relatively to the magazines for controlling the delivery of the released matrices thereto, and means distinct from but controlled by the matrices for operating the switches successively throughout the series, said means being operated in synchronism with the distributor so that a switch corresponding to a matrix bearing a certain character and of a given form is adjusted to one or another of its positions in time to control the delivery of said matrix to its appropriate magazine.

10. In a typographical distributing machine equipped with type or matrices of variant form, the combination of a single distributor for releasing the matrices at different points according to character, two channeled magazines, a series of switches, and automatic means distinct from but controlled by the matrices for operating the switches in a predetermined order of succession to control the delivery of the released matrices into the channels of one magazine or the other according to form.

11. In a typographical distributing machine equipped with type or matrices of variant form, the combination of a single distributor comprising a distributor bar and a set of matrix advancing screws, two channeled magazines to receive the matrices as they are released from the distributor, a series of switches for controlling the delivery of the matrices according to form into the channels of one magazine or the other, and means controlled by matrices and separate from the matrix advancing screws for operating the switches successively throughout the series, said means being operated in synchronism with the distributor screws so that a matrix of a given form when released from the distributor bar will be delivered to the appropriate magazine.

12. In a typographical distributing machine equipped with type or matrices of variant form, the combination of a single distributor comprising a distributor bar and a set of matrix advancing screws having threads of a certain pitch, two channeled magazines to receive the matrices as they are released from the distributor and having their channels spaced apart at a distance equal to one-half of the pitch of the screws, a series of switches for controlling the delivery of the matrices according to form into the channels of one magazine or the other, and automatic means controlled by the matrices for operating the switches successively at every half rotation of the distributor screws, for the purpose described.

13. In a typographical distributing machine equipped with matrices of variant form, the combination of a single distributor for releasing the matrices at different points according to character, a series of switches for controlling the delivery of the released matrices to one point or the other according to form, a series of rotatable cam units for operating the switches one after another, means controlled by the matrices of a given form for causing rotation of the first cam unit, and connections between the various cam units whereby the rotation of one initiates the rotation of the next and so on throughout the series.

14. In a typographical distributing machine equipped with matrices of variant form, the combination of a single distributor for releasing the matrices at different points according to character, a series of switches for controlling the delivery of the released matrices to one point or the other according to form, a constantly rotating shaft, a series of rotatable cam units for operating the switches, one after another, and provided with clutch members whereby the units may be individually connected to said shaft, means controlled by the matrices of a given form for tripping the clutch member of the first cam unit, and connections between adjacent units whereby the rotation of each causes the rotation of the next throughout the series.

15. In a typographical distributing machine equipped with matrices of variant form, the combination of a single distributor for releasing the matrices at different points according to character, a series of switches for controlling the delivery of the released matrices to one point or the other according to form, a series of rotatable cam units for operating the switches successively and each formed with two diametrically opposed cam surfaces, a series of switch-actuating levers controlled by said cam surfaces, means controlled by the matrices of a given form for causing rotation of the first cam unit, and connections between the adjacent units whereby the rotation of each causes the rotation of the next throughout the series.

16. In a typographical distributing machine equipped with type or matrices of variant form, the combination of a single distributor comprising a distributor bar and a set of matrix advancing screws, a reciprocating finger for feeding the matrices one by one to the distributor, and a device operatively connected to the finger for detecting the form of the matrices as they are individually fed to the distributor.

17. In a typographical distributing machine equipped with type or matrices of variant form, the combination of a single distributor comprising a distributor bar and a set of matrix advancing screws, a reciprocating finger for feeding the matrices one by one to the distributor, a device operatively connected to the finger for detecting the form of the matrices as they are individually fed to the distributor, and mechanism controlled by said device for sorting the matrices according to form when released from the distributor bar.

18. In a typographical distributing machine equipped with type or matrices of variant form, the combination of a single distributor comprising a distributor bar and a set of matrix advancing screws, a reciprocating finger for lifting the matrices, one by one, into the screws, a slide operatively connected to the finger, a detector connected to said slide and arranged to engage the bottom edges of the matrices as they are advanced into engagement with the bar, and an adjustable gauge plate carried by the slide for setting the detector in position to cooperate with matrices of different forms.

19. Typographical distributing mechanism for handling matrices of variant form, including a reciprocating slide, a lever pivotally mounted on the slide, a detector carried by one arm of said lever and arranged to cooperate with the matrices, a rotatable cam unit, and connections operable by the other arm of said lever for causing rotation of the unit, for the purpose described.

20. In a typographical distributing machine equipped with matrices of variant form, the combination of a single distributor for releasing the matrices at different points according to character, a series of switches for controlling the delivery of the released matrices to one point or another according to form, a series of rocking levers for operating the switches, a series of rotatable cam units adapted by their rotation to rock the levers one after another, and means controlled by the matrices of a given form for causing the rotation of the first cam unit, every other lever of the series having its lower end offset and arranged to connect adjacent cam units so that the rotation of each unit will cause rotation of the next throughout the series.

21. In a typographical distributing machine equipped with type or matrices of variant form, the combination of a single distributor for releasing the matrices at different points according to character, a series of switches for controlling the delivery of the released matrices to one point or another according to form, and matrix controlled mechanism for operating the switches in a predetermined order of succession throughout the series.

22. In a typographical distributing machine equipped with type or matrices of variant form, the combination of a single distributor for releasing the matrices at different points according to character, a series of switches for controlling the delivery of the released matrices to one point or another according to form, and matrix controlled mechanism for operating the switches in a predetermined order of succession throughout the series, said mechanism being actuated by each matrix of a given form so as to cause all of the switches of the entire series to be operated in as many cycles as there are different matrices of the given form presented for distribution.

23. In a typographical distributing machine equipped with type or matrices of variant form, the combination of a single distributor for releasing the matrices at different points according to character, a series of switches for controlling the delivery of the released matrices to one point or another according to form, mechanism for operating the switches in a predetermined order of succession throughout the series, and a matrix detector arranged to cooperate with the matrices as they are fed to the distributor for setting into operation the switch operating mechanism.

24. In a typographical distributing machine equipped with type or matrices of variant form, the combination of a single distributor for releasing the matrices at different points according to character, a series of switches for controlling the delivery of the released matrices to one point or another according to form, mechanism for operating the switches in a predetermined order of succession throughout the series, and a detector arranged to cooperate with each matrix as it is fed to the distributor and serving to set into operation the switch operating mechanism whenever a matrix of a given form is presented for distribution.

In testimony whereof, I have affixed my signature hereto.

GEORGE W. BEADLE.